US012762861B2

(12) United States Patent
Kitchen

(10) Patent No.: US 12,762,861 B2
(45) Date of Patent: Oct. 13, 2026

(54) SYSTEM AND METHOD FOR MULTI-SPOT BEAM TRACKING

(71) Applicant: BWXT Advanced Technologies LLC, Lynchburg, VA (US)

(72) Inventor: Ryan Scott Kitchen, Knoxville, TN (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 311 days.

(21) Appl. No.: 18/415,720

(22) Filed: Jan. 18, 2024

(65) Prior Publication Data

US 2024/0428588 A1 Dec. 26, 2024

Related U.S. Application Data

(60) Provisional application No. 63/442,587, filed on Feb. 1, 2023.

(51) Int. Cl.
*G06V 20/40* (2022.01)
*G06V 10/26* (2022.01)
(Continued)

(52) U.S. Cl.
CPC .............. *G06V 20/44* (2022.01); *G06V 10/26* (2022.01); *G06V 10/36* (2022.01); *G06V 10/443* (2022.01);
(Continued)

(58) Field of Classification Search
CPC ........ G06V 20/44; G06V 10/26; G06V 10/36; G06V 10/443; G06V 10/60; G06V 10/62;
(Continued)

(56) References Cited

U.S. PATENT DOCUMENTS 6,084,205 A * 7/2000 Sheaffer ............... B23K 9/0956 219/130.21
9,501,821 B2 * 11/2016 Pfitzner ................ B23K 26/034
(Continued)

FOREIGN PATENT DOCUMENTS

JP 2005014027 A * 1/2005

OTHER PUBLICATIONS

International Search Report and Written Opinion dated Jul. 3, 2024, issued in corresponding International Patent Application No. PCT/US24/12095.

(Continued)

*Primary Examiner* — Henok Shiferaw
*Assistant Examiner* — Woo C Rhim
(74) *Attorney, Agent, or Firm* — Morgan, Lewis & Bockius LLP

(57) ABSTRACT

A method is provided for tracking multiple beams in weld pools. The method includes obtaining an input video feed that includes a plurality of frames having a plurality of beams for weld pools. The method also includes, for each frame of the plurality of frames of the input video feed, creating a gradient mask that identifies one or more pixels in the respective frame for a weld pool. The method also includes detecting and filtering contiguous regions based on the gradient mask to obtain a pixel mask for each contour of a weld pool. The method also includes identifying one or more beam locations within the weld pool based on the pixel mask for each contour.

21 Claims, 7 Drawing Sheets

(51) Int. Cl.

| | |
|---|---|
| ***G06V 10/36*** | (2022.01) |
| ***G06V 10/44*** | (2022.01) |
| ***G06V 10/60*** | (2022.01) |
| ***G06V 10/62*** | (2022.01) |

(52) U.S. Cl.
CPC .............. *G06V 10/60* (2022.01); *G06V 10/62* (2022.01); *G06V 20/48* (2022.01)

(58) Field of Classification Search
CPC .... G06V 20/48; G06V 10/74; G06V 2201/06; G06V 10/44; G06V 10/469; G06V 10/25; G06V 20/46; B23K 26/032; B23K 26/342; G06T 7/70
See application file for complete search history.

(56) References Cited

U.S. PATENT DOCUMENTS

| | | | | |
|---|---|---|---|---|
| 2004/0251242 | A1* | 12/2004 | Suh | B23K 26/34<br>219/121.64 |
| 2013/0178953 | A1* | 7/2013 | Wersborg | G06N 3/006<br>700/48 |
| 2014/0326705 | A1* | 11/2014 | Kodama | B23K 26/042<br>219/121.83 |
| 2017/0095885 | A1* | 4/2017 | Zhang | B23K 26/21 |
| 2017/0297140 | A1* | 10/2017 | Taminger | B23K 15/02 |
| 2018/0133840 | A1* | 5/2018 | Noriyama | B23K 26/342 |
| 2018/0141121 | A1* | 5/2018 | Niitani | G01J 5/004 |
| 2019/0076964 | A1* | 3/2019 | Ichinohe | B23K 26/00 |
| 2019/0201979 | A1* | 7/2019 | Huang | B22F 12/90 |
| 2021/0170676 | A1* | 6/2021 | Kitchen | G06T 7/254 |
| 2021/0318673 | A1* | 10/2021 | Kitchen | B23K 31/006 |
| 2022/0080519 | A1* | 3/2022 | Pippins | B23K 9/0953 |
| 2022/0152723 | A1* | 5/2022 | Benzing | B23K 9/201 |
| 2022/0363826 | A1* | 11/2022 | Fry | B29B 13/10 |
| 2022/0395904 | A1* | 12/2022 | Lock | B33Y 50/00 |
| 2023/0384282 | A1* | 11/2023 | Fujiwara | G01N 33/207 |
| 2024/0261900 | A1* | 8/2024 | Kayashima | B22F 12/90 |
| 2024/0333941 | A1 | 10/2024 | Kitchen et al. | |
| 2024/0428588 | A1* | 12/2024 | Kitchen | B23K 26/342 |

OTHER PUBLICATIONS

International Preliminary Report on Patentability dated Jul. 31, 2025, issued in corresponding International Patent Application No. PCT/US2024/012095.

* cited by examiner

300

320

SYSTEM AND METHOD FOR MULTI-SPOT BEAM TRACKING

RELATED APPLICATION DATA

This application is based on and claims priority under 35 U.S.C. § 119 to U.S. Provisional Application No. 63/442,587, filed Feb. 1, 2023, the entire contents of which is incorporated herein by reference.

STATEMENT REGARDING FEDERALLY SPONSORED RESEARCH OR DEVELOPMENT

The invention described herein was made in the performance of work under DOE Cooperative Agreement No. DE-NE0008744. The Government has certain rights in this invention.

TECHNICAL FIELD

The disclosed implementations relate generally to manufacturing and more specifically to systems and methods for multi-spot beam tracking.

BACKGROUND

A key data source for any welding-based operation (e.g., powder bed fusion additive manufacturing) is the weld pool video feed. The weld pool video feed enables analysis of the shape and thermal profile of the weld. The weld pool video feed can be used for material property prediction, defect detection, and other purposes. For this reason, some laser powder bed fusion machines include a thermal camera that coaxially tracks the welding beam using a mirror that also controls the beam positioning. However, not all laser machines have this functionality. For example, this functionality is physically impossible on an electron beam system because the beam is not controlled with a mirror. Machines that do not have coaxial cameras can be equipped with a camera system having a fixed viewpoint of a build area. For example, electron-beam melting (EBM) systems can be retrofitted with a high-speed infrared camera to record build data. To effectively use build data to characterize operations, it is necessary to track the location of weld pools so that they can be associated with the geometry of the component. Tracking a single beam is a trivial computational problem, as it is usually the brightest or hottest point in an image. However, some laser systems and most EBM systems can maintain multiple weld pools simultaneously.

SUMMARY

Accordingly, there is a need to detect and track arbitrary numbers of weld pools or beam locations in a live video feed or stored video file. The techniques described herein may be performed in real-time, so data analysis and targeted video recording can occur on high-speed feeds that would otherwise produce too much data. Moreover, these techniques can be used to effectively track beams on systems with pulsing beams or oscillating beam locations. The methods described herein can be used to identify generated beam paths on systems with black-box path generation. These methods help automatically detect positions where beams cross/intersect, which correlate to defect formation. Additionally, it is possible to track beams that are close together using these techniques. These techniques provide the ability to track an arbitrary number of beams in various complex situations. Not exclusive to weld pools and beams, these techniques can be used for tracking specific movement paths of other moving things, such as particles, sparks, slag, and any high-contrast or bright objects that might not be unique enough to track with traditional feature detectors. Furthermore, the techniques described herein may be integrated directly into control systems or other applications for welding and/or manufacturing.

In accordance with some implementations, a method executes at a computing system. Typically, the computing system includes a single computer or workstation, or a plurality of computers, each having one or more CPU and/or GPU processors and memory. The method does not generally require a computing cluster or supercomputer. The method can be used for tracking multiple beams in weld pools.

The method includes obtaining an input video feed that includes a plurality of frames having a plurality of beams for weld pools. The method also includes, for each frame of the plurality of frames of the input video feed, creating a gradient mask that identifies one or more pixels in the respective frame for a weld pool. The method also includes detecting and filtering contiguous regions based on the gradient mask to obtain a pixel mask for each contour of a weld pool. The method also includes identifying one or more beam locations within the weld pool based on the pixel mask for each contour.

In some implementations, identifying the one or more pixels includes, for each pixel in the respective frame, calculating a time-based derivative of intensity for the respective pixel based on the respective frame and its predecessor frame in the video feed, and determining potential locations of weld pools based on the time-based derivative of intensity for each pixel.

In some implementations, determining potential locations of the weld pools includes computing at least one of: (i) relative intensity of each pixel with respect to background imagery, (ii) light emissions intensity of material used for welding in near-infrared (NIR) and infrared (IR) spectrums, or (iii) a rapid decrease in intensity.

In some implementations, determining potential locations of the weld pools includes thresholding the time-based derivative for each pixel with a high-low pass filter to create the gradient mask, thereby marking pixels with either a rapid increase or decrease in value as possible weld pool locations.

In some implementations, the high-low pass filter is applied to the time-based derivative and includes two threshold values including (i) a low value that is a negative number, for which delta values below the low value represent a phase change from powder to liquid metal, and (ii) a high value that is a positive number, above which either there is increasing heat or a beam is crossing over a pixel.

In some implementations, the method further includes defining a respective threshold for each weld type.

In some implementations, the method further includes using a morphological close filter on the gradient mask to close any gaps between isolated pixels surrounding a possible weld pool location.

In some implementations, obtaining the pixel mask for each contour of a weld pool includes detecting contours based on the gradient mask, filtering the contours by size with a high-pass filter in order to eliminate any regions too small to reasonably be a weld pool, and outputting the pixel mask for each remaining contour.

In some implementations, identifying the one or more beam locations within each weld pool includes identifying a peak intensity by computing a local maximum value within the pixel mask for each contour, identifying missing beams for each contour by determining if the peak intensity is below a predetermined range, applying a high-pass threshold to surrounding area based on the peak intensity to determine a spot area, and computing coordinates of the beam location based on a mean value or center of mass of the spot area.

In some implementations, identifying the one or more beam locations within each weld pool further includes identifying multiple beam locations in the weld pool by (i) measuring a total size and aspect ratio the weld pool, and (ii) in accordance with a determination that the weld pool has a substantially increased size or a moderately increased size and an unusual aspect ratio, detecting bimodal peaks within a high intensity range.

In another aspect, a method is provided for tracking multiple beams in weld pools. In accordance with some implementations, the method executes at a computing system. Typically, the computing system includes a single computer or workstation, or a plurality of computers, each having one or more CPU and/or GPU processors and memory. The method does not generally require a computing cluster or supercomputer. The method can be used for tracking multiple beams in weld pools.

The method includes, for each frame in a video feed, detecting one or more events, each event corresponding to a respective beam location within a weld pool in the respective frame. The method also includes generating a queue of match scores for the one or more events and a plurality of beam trackers. Each match score represents a degree of match between a respective event of the one or more events and a respective beam tracker of a plurality of beam trackers. Each beam tracker is associated with a list of detection event objects. Each detection event object is associated with a beam of one or more beams. The method also includes processing the queue of match scores to identify a respective beam tracker of the plurality of beam trackers to pair with each event of the one or more events. The method also includes processing unpaired events of the one or more events to associate the unpaired events with (i) a corresponding tracker of the plurality of beam trackers, or (ii) a new tracker, including adding the new tracker to the plurality of beam trackers.

In some implementations, detecting the one or more events includes identifying a weld pool by detecting and filtering contiguous regions in the respective frame, storing a bounding box of the weld pool in a new detection event object for an event of the one or more events, identifying a beam location within the weld pool based on detecting peak intensities and high-pass thresholding a surrounding area with the peak intensities, and storing coordinates of the beam location in the new detection event object.

In some implementations, detecting the one or more events further includes determining if the weld pool includes multiple beam locations by measuring a total size and aspect ratio of the weld pool, and in accordance with a determination that the weld pool includes multiple beams and in accordance with a determination that there are bimodal peaks in the peak intensities, generating a second detection event object for a second beam location within the weld pool.

In some implementations, generating the queue of match scores includes calculating and adding, to the queue of match scores, a match score between the respective event and the respective beam tracker, based on (i) a position of the respective event $P_E$, (ii) a last known location of the respective beam tracker $P_T$, (iii) a number of timesteps since last detection in the respective beam tracker $\Delta_T$, (iv) a predicted next location of the respective beam tracker $P_P$, (v) an average global beam velocity per timestep $\mu_v$, and (vi) a user-defined maximum velocity $V_{max}$.

In some implementations, generating the queue of match scores further includes forgoing adding the match score to the queue in accordance with a determination that distance between $P_E$ and $P_T$ is greater than $V_{max}*\Delta_T$.

In some implementations, the match score is an ordered structure that includes $$\Delta V_T = \frac{\text{abs}(dist(P_T, P_P) - dist(P_T, P_E))}{\mu_V * \Delta T},$$

which corresponds to the magnitude of acceleration/deceleration, normalized to average velocity, $$\theta_{EP} = \text{abs}\left(\frac{\cos^{-1}\left(\frac{(P_E - P_T)\cdot(P_P - P_T)}{dist(P_E, P_T) * dist(P_P, P_T)}\right)}{180}\right),$$

which corresponds to an angle between the vector to the event and the vector to the prediction, normalized to 180, $$V_{MD} = \frac{\text{abs}(dist(P_T, P_E) - \mu_V * \Delta T) + \max(0, dist(P_T, P_E) - \mu_V * \Delta T)}{\mu_V * \Delta T},$$

which corresponds to a mean deviation from average velocity, normalized to average velocity, plus a penalty for exceeding average velocity; and a vector/list of indices of the respective event and the respective beam tracker.

In some implementations, processing the queue of match scores includes determining if each event of the one or more events can be paired with each beam tracker of the plurality of beam trackers based on the queue of match scores. An event can be paired with a beam tracker only if its corresponding match score in the queue of match scores is above a predetermined threshold. The method also includes: for each beam tracker of the plurality of beam trackers, when the respective beam tracker cannot be paired with any event of the one or more events, removing the respective beam tracker from the queue. When the respective beam tracker can be paired with more than one event of the one or more events, the method sorts pairs and selects a best matching event based on match scores for the pairs. The method also includes, when the respective beam tracker can be paired with only one event of the one or more events and the only one event can be paired with more than one beam tracker: adding paired beam trackers to the only one event's crossing list and updating paired beam trackers' crossing timesteps. When (i) the respective beam tracker corresponds to a best match for the only one event or (ii) the only one event can be paired with only the respective beam tracker, the method includes the only one event in the list of detection event objects for the respective beam tracker, removes all pairs containing either the only one event or the respective beam tracker from the queue, and removes the respective beam tracker from the queue.

In some implementations, processing the unpaired events includes calculating a crossing time threshold CTT, which is a maximum amount of time after which a beam should separate or reappear after having crossed with another beam, based on formula:

$$CTT = \frac{2 * (\text{average weld pool length})}{\mu_V}.$$

Here, $\mu_v$ is an average global beam velocity per timestep. The method identifies one or more beam trackers from the plurality of beam trackers to pair with each unpaired event, based on checking all events for all beam trackers with timestamps in the last CTT timesteps for crossing list entries.

In some implementations, processing the unpaired events further includes, while checking all events for all beam trackers with timestamps in the last CTT timesteps for crossing list entries, disregarding beams that have not been detected within the period of time IT calculated based on a threshold that is the greater of the following two values: (a) if on a machine that has pulsed beams or beams that rapidly cycle between locations, then $$IT = \frac{\text{Maximum period of oscillation}}{\text{Length of timestep}} + 1,$$

and (b) otherwise, IT=CTT, to account for crossing events.

In some implementations, the method further includes extracting weld pool images for each beam tracker of the plurality of beam trackers that is active in each video frame of the video feed.

In some implementations, each beam tracker further includes (i) a unique identifier, (ii) a video output file or object for a video being extracted, (iii) a cache list or vector of images, and (iv) an integer presenting a last crossing timestep.

In some implementations, each detection event object includes (i) X/Y coordinates of a beam, (ii) a frame number or timestep, (iii) a bounding box and/or a pixel mask of the detected weld pool area, and (iv) a list of tracker identifiers in case of crossing events.

In some implementations, a computing system includes one or more computers. Each of the computers includes one or more processors and memory. The memory stores one or more programs that are configured for execution by the one or more processors. The one or more programs include instructions for performing any of the methods described herein.

In some implementations, a non-transitory computer readable storage medium stores one or more programs configured for execution by a computing system having one or more computers, each computer having one or more processors and memory. The one or more programs include instructions for performing any of the methods described herein.

Thus, methods and systems are disclosed that efficiently track multi-spot beams for manufacturing.

BRIEF DESCRIPTION OF THE DRAWINGS

For a better understanding of the disclosed systems and methods, as well as additional systems and methods, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Multiple weld pools create challenges. For example, it is not sufficient to look for the brightest point in an image to find the beams. Alternate methods need to be used. Moreover, electron beam systems can maintain an arbitrary number of weld pools or beams. This number can be twenty or more. The number of weld pools presents may vary over time. When multiple beams are present, they may come close to or even cross over each other, leading to tracking issues with most motion-tracking algorithms. Weld consistency is most variable at the beginning and end of the weld. For this reason, some implementations identify each weld's starting and stopping locations over time. Some implementations track the instantaneous location of any beams or weld pools in each image, log directional velocity and acceleration of the beams, identify beam crossing points, and/or retroactively interpolate beam position during periods of a singular or unified weld pool. Some implementations track new beam formation and/or log starting and stopping points. Some implementations extract cropped videos centered on each beam, thereby enabling weld analysis methods designed for coaxial feeds on machines that lack coaxial cameras.

Figure 1:
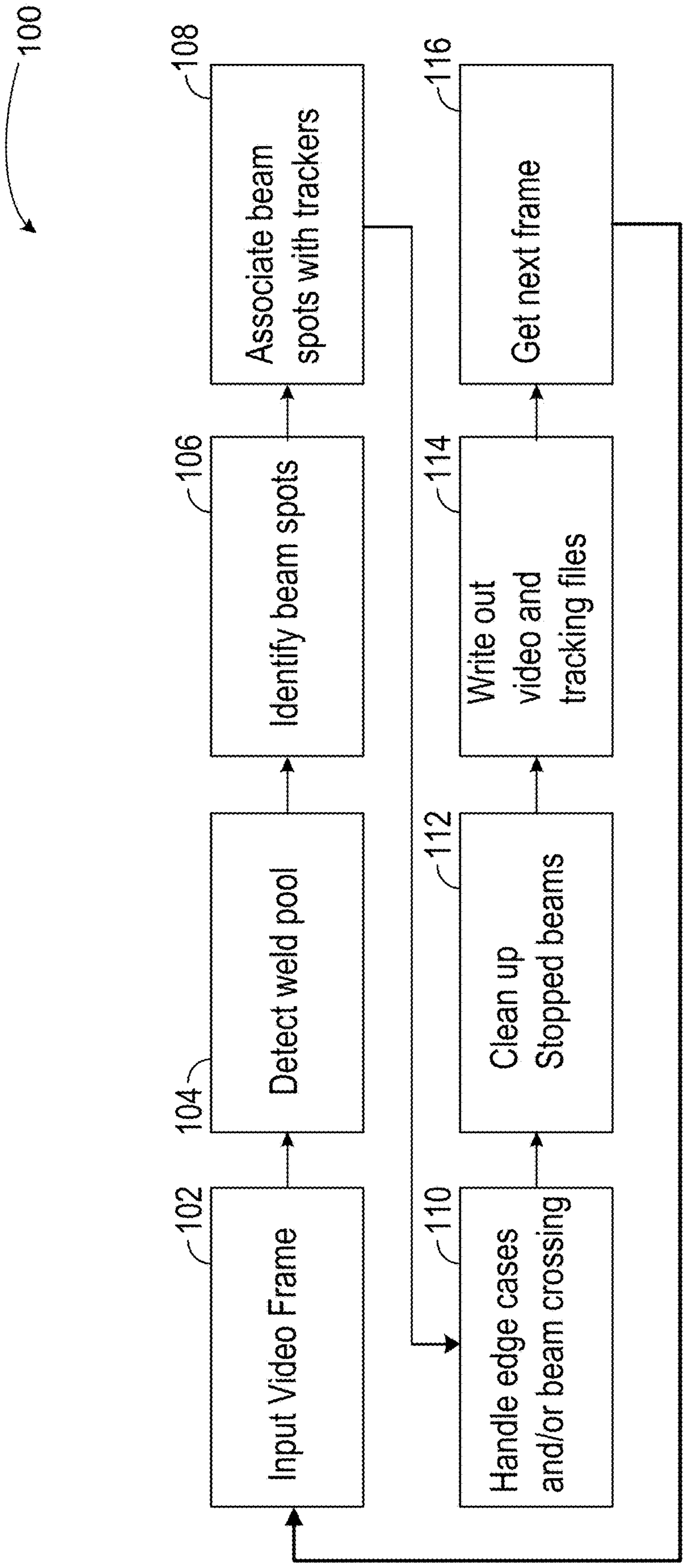
FIG. 1 is a diagram of an example process for multi-spot beam tracking, according to some implementations.

FIG. 1 is a diagram of an example process 100 for multi-spot beam tracking, according to some implementations. Some implementations process (102) input video frames, detect (104) weld pools, and/or identify (106) beam spots. Some implementations associate (108) beam spots with trackers. Some implementations handle (110) edge cases and/or beam crossing. Some implementations clean up (112) stopped beams. Some implementations write out (114) video and tracking files. Some implementations iterate (116) through frames of a video feed. These steps are described in detail below.

The techniques described herein can be used to track multiple beams and/or weld pools in a single video. In some implementations, beam locations are tracked per-frame using a beam tracker data structure. The beam data structure may include (i) a unique identifier, (ii) a video output file or object (if the video is being extracted), (iii) a cache list/ vector of images, (iv) a list/vector of detection event objects, (v) an integer representing the last "Crossing Timestep," defaulting to a minimum value (e.g., the lowest possible integer representable in the system), and/or (vi) detection event objects containing the following data: X/Y position of the beam, frame number/timestep, bounding box and/or pixel mask of detected weld pool area, and/or list of tracker identifiers in case of crossing event.

In some implementations, the beam tracker objects are stored in one or more vectors/lists (e.g., an active list and a finished list). Initially, these vectors/lists may be empty. For each frame in the video/feed, some implementations (i) create an empty list/vector of detection events for the current frame and (ii) identify pixels that may contain a weld pool. Rather than using a threshold on the image itself and looking for the maximum value, some implementations use two consecutive frames in a video feed to identify the time-based derivative (or gradient) of intensity for each pixel. This may be a simple, pixel-wise subtraction:

$$\frac{dI}{dt}(x, y, t) = \text{Frame}(x, y, t) - \text{Frame}(x, y, t-1)$$

In some implementations, potential locations of weld pools are determined based on the observation of pixels on or surrounding the pool. The beam is typically moving, and is brighter than the background imagery, so there is likely a high, positive time delta in intensity. The beam is depositing heat into the surrounding material. If the material does not change phase from solid into liquid, the light emission intensity of the material is likely to increase. This is especially true in the NIR and IR spectrums. If the material does change phase, the emissions will decrease. Liquid metal typically has less emissions in visible, NIR, and IR spectrums, as compared to the superheated solid metal around it. This is likely to result in a rapid decrease in intensity.

Some implementations threshold the time-derivative for each pixel with a high-low pass filter to create a gradient mask. Some implementations define a threshold for each pixel. In some implementations, pixels with either a rapid increase or decrease in value are marked as possible weld pool locations. This threshold need not be particularly conservative. Some implementations use a morphological close filter on the gradient mask to close in any gaps between isolated pixels surrounding a possible weld pool location. Some implementations detect and/or filter contiguous regions. Some implementations apply a contour detection algorithm to the gradient mask. Some implementations filter contours by size with a high-pass filter in order to eliminate regions that may be too small to reasonably be a weld pool. Some implementations store the bounding box of the weld pool in a new detection event object, and add it to a current frame's event list. Some implementations output a pixel mask for each remaining contour. Some implementations identify a beam location within the weld pool. This may be performed by finding the local maximum value within the pixel mask for each contour.

For electron beam systems, the beam may not be visible in every frame as it rapidly alternates between different weld pools. Whether a beam has stopped or not may be determined in a different step. Suppose a beam is still active. Some implementations check if the peak intensity is within a range typically expected for a beam (e.g., the top 1% of the intensity range in the image). If the intensity is lower than expected, some implementations mark the beam as "missing beam" and leave the X/Y position empty. Once a peak is detected, some implementations conservatively high-pass threshold the surrounding area based on the peak value to determine the spot area. In some implementations, the X/Y position of the beam is the mean value/center of mass of the spot area. Some implementations store the X/Y position (if applicable) of the peak into the detection event object for this pool.

Since beams may cross over each other, there may be multiple beam locations in the same weld pool. It can easily be determined if this case is likely by measuring the total size and aspect ratio of the weld pool. This is because doubling the thermal input of the weld results in a rapid expansion in width and potentially length of the pool. If the weld pool has a substantially increased size, or a moderately increased size and an unusual aspect ratio, some implementations check if there are bimodal peaks within the high intensity range. If this is the case, some implementations create a separate detection event for the second beam.

Some implementations create a queue of match scores to evaluate suitability between detected events and existing trackers. For each combination of tracker and detection event, some implementations calculate a match score. This is determined using one or more of the following values: (i) the position of the detection event ($P_E$), (ii) the last known location of the tracker ($P_T$), (iii) the number of timesteps since the last detection in the tracker ($\Delta T$), and (iv) the predicted next location of the tracker ($P_P$). This is typically the last position of the tracker, plus the delta between the last two detected positions in the tracker multiplied by the number of timesteps since the last detection. In applications with low resolution, slow beam movement speed, or high framerates, this delta may need to be calculated based on multiple previous values. If the tracker is new (has only one value), this value may be ignored. The determination also uses (v) the average global beam velocity per timestep ($\mu_v$) and/or (vi) a user-defined maximum velocity ($V_{max}$).

Some implementations pre-filter matches by distance. Some implementations do not create records for any matches where the following is true: $\text{dist}(P_T, P_E) > (V_{max} * \Delta T)$.

In some implementations, the match score is an ordered structure including one or more of the following values:

$$\Delta V_T = \frac{\text{abs}(dist(P_T, P_P) - dist(P_T, P_E))}{\mu_V * \Delta T}$$

(magnitude of acceleration/deceleration, normalized to average velocity);

$$\theta_{EP} = \text{abs}\left(\frac{\cos^{-1}\left(\frac{(P_E - P_T)\cdot(P_P - P_T)}{dist(P_E, P_T) * dist(P_P, P_T)}\right)}{180}\right)$$

(the angle between the vector to the event and the vector to the prediction, normalized to 180);

$$V_{MD} = \frac{\text{abs}(dist(P_T, P_E) - \mu_V * \Delta T) + \max(0, dist(P_T, P_E) - \mu_V * \Delta T)}{\mu_V * \Delta T}$$

(Mean Deviation from average velocity, normalized to average velocity, plus a penalty for exceeding average velocity); and/or.

the vector/list of indices of the Detection Event and Beam Tracker for this match Some implementations add each match score object to the queue.

In some implementations, matches are compared to each other using the following method. Each metric is compared in order. This structure is prioritized to bias towards matching known velocity and direction of a beam's movement, and then failing that, to prefer beam movements that are closest to the average beam velocity. If two match score metrics are within a defined tolerance together (e.g., 10% of the total value), the next metric is evaluated. Otherwise, the system prefers the match with the lowest score. If all of these metrics fail to create a clear winner, the system performs the same test without the tolerance. Failing this test, the system picks one arbitrarily (exact match) because the distinction between the two beams/weld pools at this point is irrelevant (and the two are likely crossing).

Figure 2:
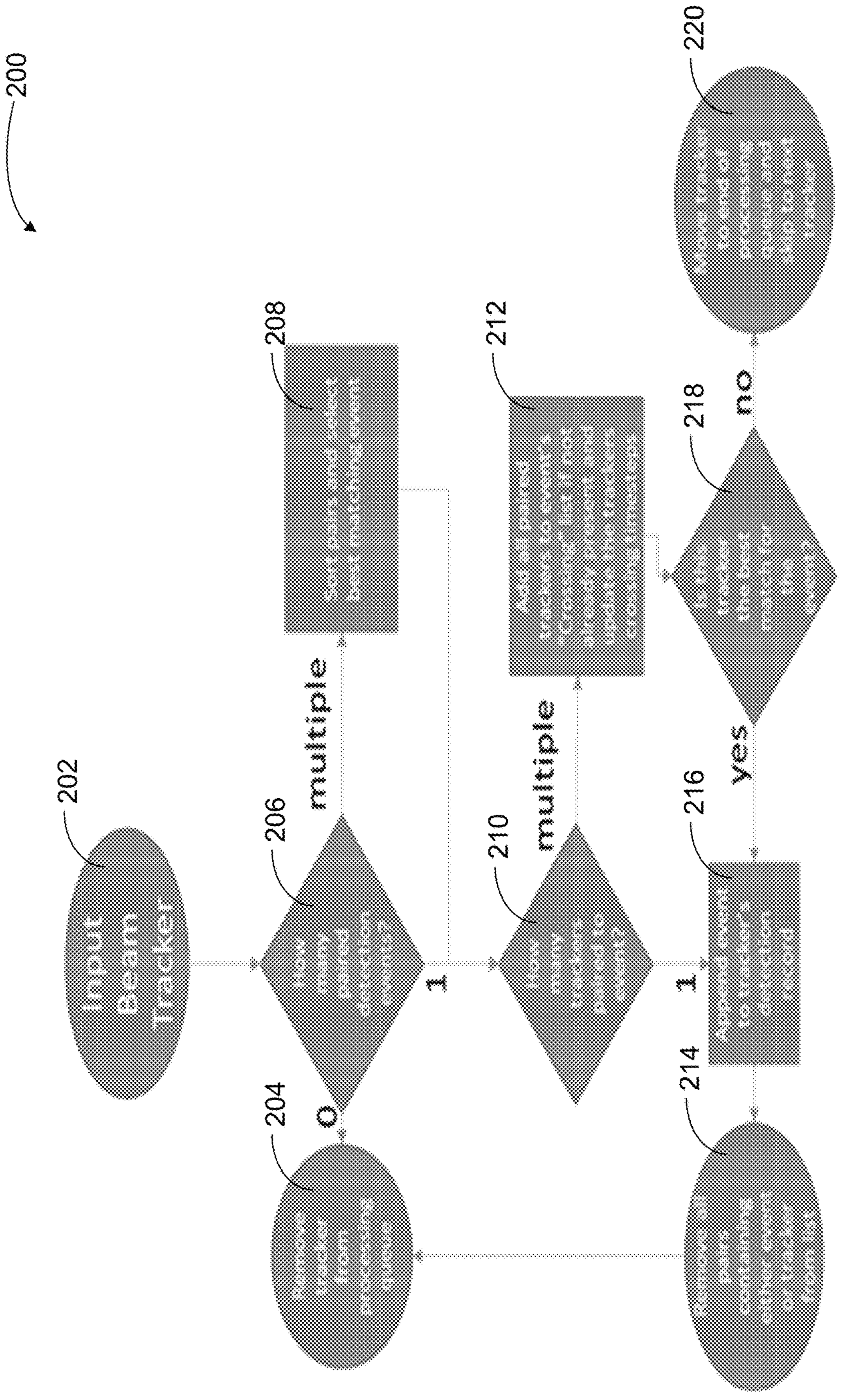
FIG. 2 is a flowchart of an example method for matching beam spots with trackers, according to some implementations.

FIG. 2 is a flowchart of an example method 200 for matching beam spots with trackers, according to some implementations. Some implementations process a queue (sometimes referred to as the processing queue) of matching scores. Some implementations use an iterative algorithm for the matching. The steps shown in FIG. 2 may be performed for each tracker in the processing queue until it is empty. Suppose there is an input beam tracker 202. Some implementations compute (206) the number of paired detection events. If there are no paired detection events, the algorithm stops after removing (204) the tracker from the processing queue. If there are multiple paired detection events, some implementations sort (208) pairs and select the best matching event. Subsequently, some implementations compute (210) the number of trackers paired to an event. If there is only one such tracker, some implementations append (216) the event to the tracker's detection record. If there are multiple trackers paired to the event, some implementations add (212) all paired trackers to an event's crossing list if not already present and update the trackers' crossing timesteps. Some implementations determine (218) if the current tracker is the best match for the event. If so, or if there is only one tracker paired to the event, the event is appended (216) to the tracker's detection record. Otherwise the tracker, the tracker is moved to end of the processing queue and the algorithm skips (220) to the next tracker (in the queue). After appending the event to the tracker's detection record, the algorithm removes (214) from the list all pairs containing either the event or the tracker, following which the tracker is removed (204) from the processing queue and the algorithm stops.

Some implementations use the Hungarian combinatorial optimization algorithm to process the queue. Some implementations handle vector cost values. In practice, this may be unnecessary for beam matching as situations with more than three possible matches are rare. Because the velocity of beams is not prone to change, the best match between beam and predicted value is generally the correct match. In comparison to this method using the Hungarian combinatorial optimization algorithm, the method described above in reference to FIG. 2 maximizes the number of best matches.

Some implementations handle unpaired events as described herein. Each unpaired event is either associated with an existing tracker, or is the starting point for a new tracker. Crossing time threshold is defined as the maximum amount of time after which a first beam should separate or reappear after having crossed with another beam (where the first beam would likely only be detected and associated with one tracker). This threshold is calculated based on the following formula:

$$CTT = \frac{2 * (\text{average weld pool length})}{\mu_V}$$

In some implementations, the threshold can also be set manually to some other value (e.g., a smaller value than provided by the equation above, if the beams are easily separated from within the same weld pool).

Some implementations check detection events on all trackers with timestamps in the last CTT timesteps for crossing list entries. Some implementations create an empty pairing list. For each event with a list, some implementations check if dist($P_T$, $P_E$)<$V_{MAX}$*ΔT at the timestep of the crossing event. If so, some implementations perform the following steps for each tracker on the list (except the tracker containing the crossing event). Some implementations create a what-if score for the tracker, as if the crossing event had been inserted into the tracker's history. Some implementations check if dist($P_T$, $P_E$)≤$V_T$*ΔT at this time step, where $V_T$ is the velocity based on the tracker's previous event and the crossing event. If not, some implementations skip this tracker. If this tracker already has a subsequent event, some implementations check if the subsequent event's match score is better than the crossing event. If so, this tracker is skipped. If not, or if no subsequent event exists, the tracker/new event is added to the pairing list. If the pairing list is not empty, some implementations select the tracker with the best match score. If the match already has any associated events after the detection, some implementations move these events into a new tracker and add it to the Active list. Some implementations duplicate the crossing event into this tracker's history. Some implementations append the unpaired event to the best matching tracker. In some implementations, a new tracker is created with any unpaired event as its first event.

Some implementations clean up the active tracker list as described herein. Beams that have not been detected within a certain period of time are moved from the active list to the finished list (as they have turned off/stopped). This value is referred to as the Inactive Threshold (IT). The threshold of this upper boundary is the greater of the following two values: (i) if on a machine that has pulsed beams or beams that rapidly cycle between locations, then $$IT = \frac{\text{Maximum period of oscillation}}{\text{Length of timestep}} + 1$$

and (ii) IT=CTT (in order to account for crossing events). This prevents new events from being erroneously associated with unlinked weld pools. If video is being captured, some implementations write out the cached frames based on the method below before moving to the finished list. Some implementations write out the beam path to an appropriate file (e.g., an Excel spreadsheet, a CSV file, or an HDF5 file).

Some implementations extract weld pool images for each active beam tracker as described herein. A rolling buffer of at least IT full images is maintained in case corrections to beam position are needed due to crossing updates or other reasons. If the tracker's Crossing Timestep is less than CTT timesteps before the current timestep, some implementations do nothing. If the current timestep is exactly CTT timesteps after the Crossing Timestep, some implementations process all of the images for the past CTT frames before the current frame. If the tracker is being terminated, some implementations process all frames since the last event. The Region of Interest (ROI) is a window of predetermined size, centered on the beam. For each timestep being processed, some implementations perform the following steps. If there is no event for this timestep: if the tracker is being terminated, the center position is the last known beam location from the last event; if there is an event after this timestep, use linear interpolation between the previous event and the next event to identify the beam position/center location; and otherwise, skip to the next tracker (this beam is done processing). Otherwise, some implementations take the beam position from the current event as the center location, and/or crop the image to the ROI around the center location. Some implementations write the cropped image to an output video file or object.

Figure 3A:
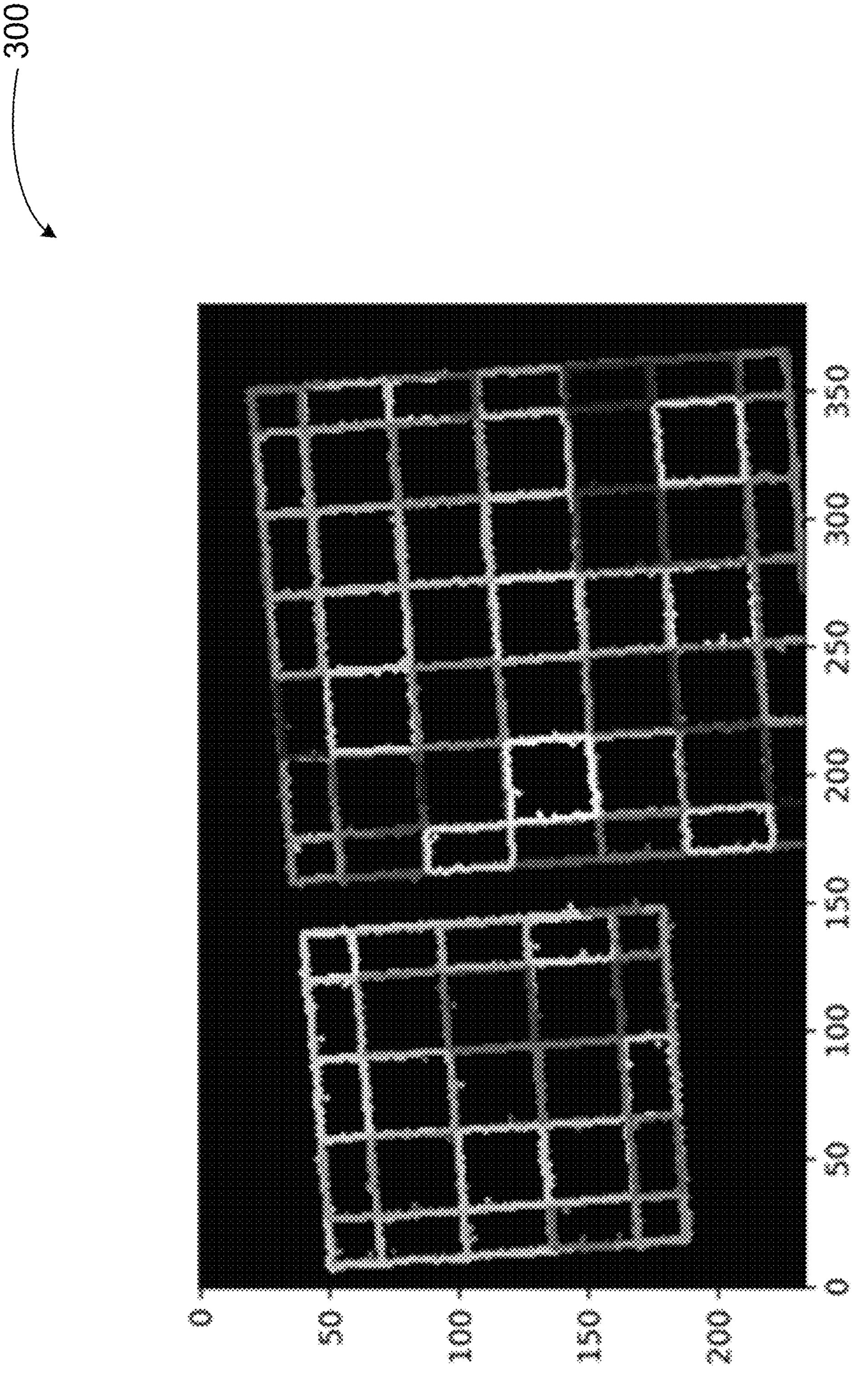
FIG. 3A shows example color-mapped beam paths showing detected beams, according to some implementations (the shading corresponds to the color in the original).
Figure 3B:
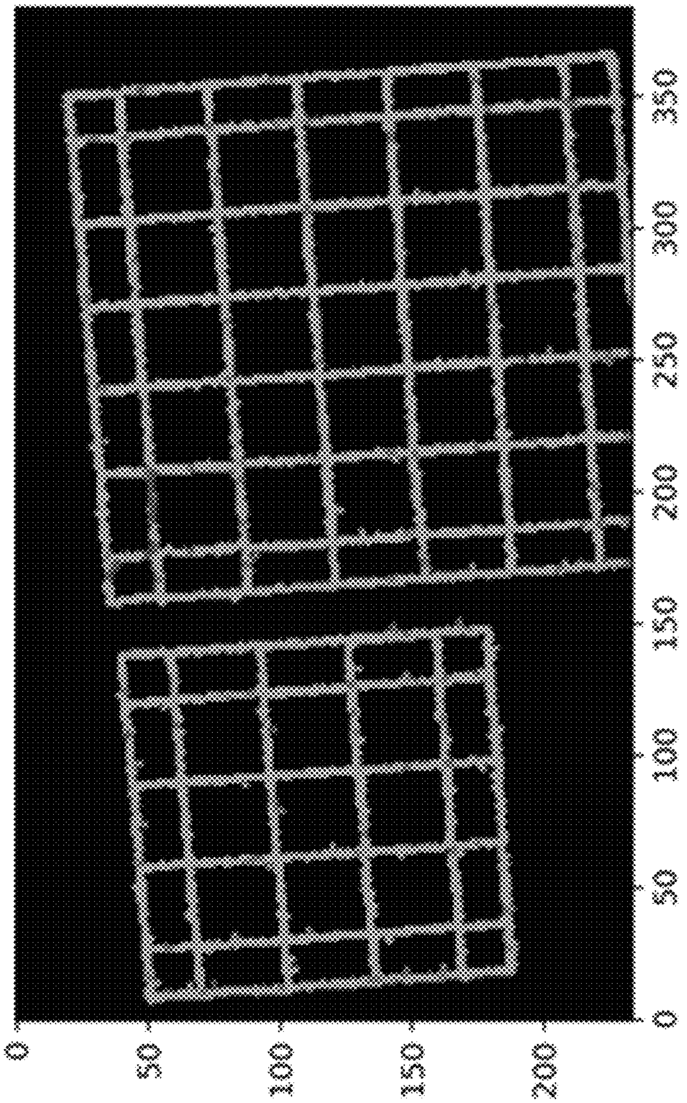
FIG. 3B shows an example color mapping of beam paths, according to some embodiments (the shading corresponds to the color in the original).

FIGS. 3A and 3B show example beam paths from a high speed infrared video, according to some implementations. FIG. 3A shows example color-mapped beam paths 300 (illustrated here by shading) showing dozens of detected beams. Each color corresponds to a path of a beam. FIG. 3B shows an example color mapping 302. Start or stop points are shown in purple and points where beams crossed are shown in red.

Figure 4:
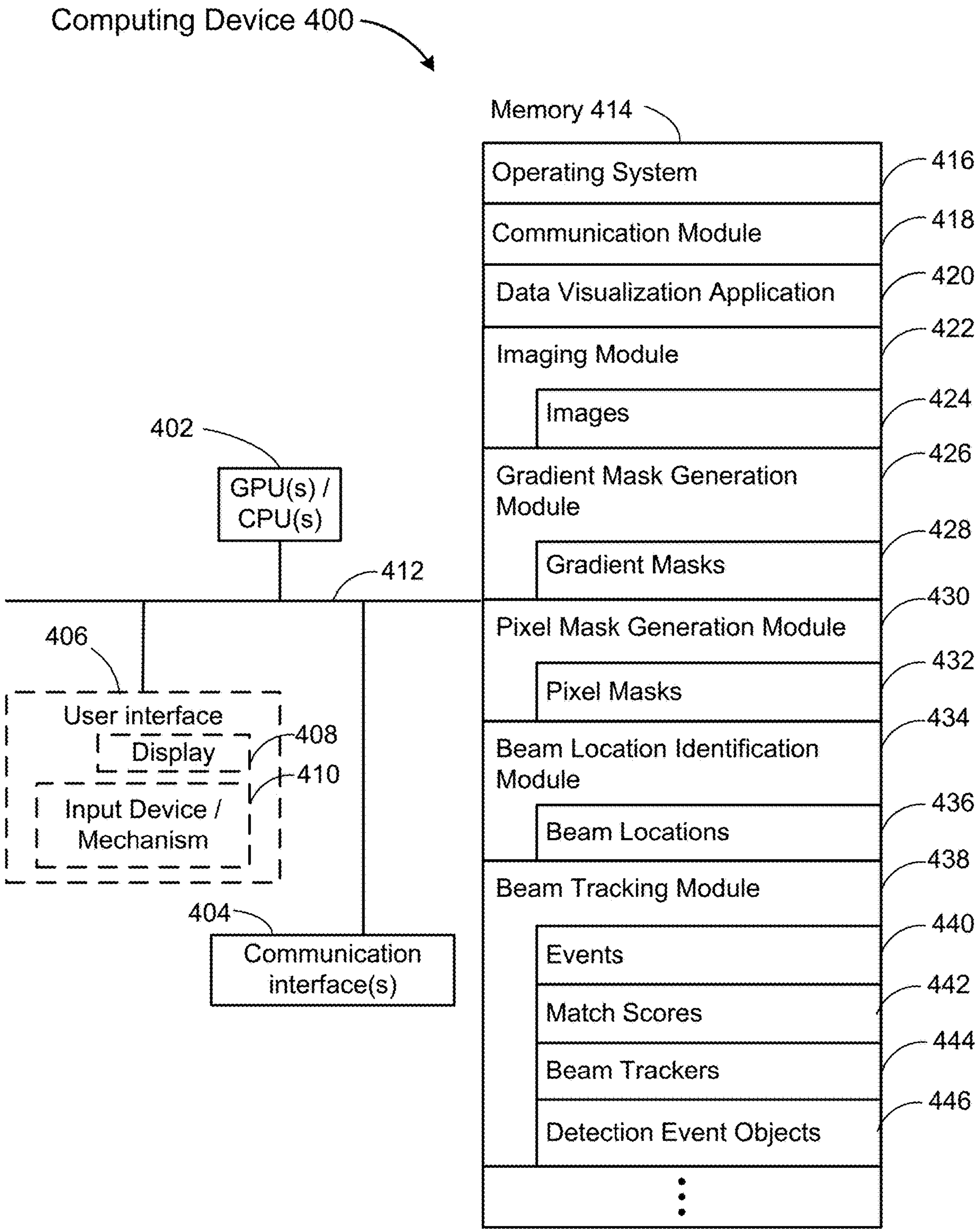
FIG. 4 is a block diagram illustrating a computing device in accordance with some implementations.

FIG. 4 is a block diagram illustrating a computing device 400 in accordance with some implementations. Various examples of the computing device 400 include high-performance clusters (HPC) of servers, supercomputers, desktop computers, cloud servers, and other computing devices. The computing device 400 typically includes one or more processing units/cores (CPUs and/or GPUs) 402 for executing modules, programs, and/or instructions stored in the memory 414 and thereby performing processing operations; one or more network or other communications interfaces 404; memory 414; and one or more communication buses 412 for interconnecting these components. The communication buses 412 may include circuitry that interconnects and controls communications between system components.

The computing device 400 may include a user interface 406 comprising a display device 408 and one or more input devices or mechanisms 410. In some implementations, the input devices include a high speed infrared camera (e.g., a high speed infrared camera in an EBM system) that may be used to obtain video frames (sometimes referred to as a video feed or an input video feed) for a weld process. In some implementations, the input device/mechanism includes a keyboard. In some implementations, the input device/mechanism includes a "soft" keyboard, which is displayed as needed on the display device 408, enabling a user to "press keys" that appear on the display device 408. In some implementations, the display device 408 and input device or mechanism 410 comprise a touch screen display (also called a touch sensitive display).

In some implementations, the memory 414 includes high-speed random access memory, such as DRAM, SRAM, DDR RAM or other random access solid state memory devices. In some implementations, the memory 414 includes non-volatile memory, such as one or more magnetic disk storage devices, optical disk storage devices, flash memory devices, or other non-volatile solid state storage devices. In some implementations, the memory 414 includes one or more storage devices remotely located from the GPU(s)/CPU(s) 402. The memory 414, or alternatively the non-volatile memory device(s) within the memory 414, comprises a non-transitory computer readable storage medium. In some implementations, the memory 414, or the computer-readable storage medium of the memory 414, stores the following programs, modules, and data structures, or a subset thereof:

- an operating system 416, which includes procedures for handling various basic system services and for performing hardware dependent tasks;
- a communications module 418, which is used for connecting the computing device 400 to other computers and devices via the one or more communication network interfaces 404 (wired or wireless) and one or more communication networks, such as the Internet, other wide area networks, local area networks, metropolitan area networks, and so on;
- an optional data visualization application or module 420 for displaying visualizations of models and/or beam formations;
- an imaging module 422 for obtaining images 424 (sometimes referred to as frames or image frames). For example, the imaging module 422 may obtain frames of a video feed that include multiple beams in weld pools;
- a gradient mask generation module 426 for generating (or creating) gradient masks 428 that identify pixels in frames for a weld pool;
- a pixel mask generation module 430 for detecting and filtering contiguous regions based on a gradient mask to obtain pixel masks 432;
- a beam location identification module 434 for identifying beam locations 436 within a weld pool based on a pixel mask; and/or
- an optional beam tracking module 438 for (i) detecting events 440 corresponding to beam locations within a weld pool in a video frame, (ii) generating a queue of match scores 442 for the events and beam trackers 444, each match score representing the degree of match between a respective event and a respective beam tracker (each beam tracker may be associated with a list of detection event objects 446, each detection event object associated with a beam), (iii) processing the queue of match scores to identify a respective beam tracker to pair with an event, and/or (iv) processing unpaired events to associate such events with a corresponding tracker or a new tracker.

Each of the above identified executable modules, applications, or sets of procedures may be stored in one or more of the previously mentioned memory devices, and corresponds to a set of instructions for performing a function described above. The above-identified modules or programs (i.e., sets of instructions) need not be implemented as separate software programs, procedures, or modules. Thus various subsets of these modules may be combined or otherwise re-arranged in different implementations. In some implementations, the memory 414 stores a subset of the modules and data structures identified above. Furthermore, the memory 414 may store additional modules or data structures not described above. The operations of each module and properties of the data structures shown in FIG. 4 are further described below, according to some implementations.

Although FIG. 4 shows a computing device 400, FIG. 4 is intended more as a functional description of the various features that may be present rather than as a structural schematic of the implementations described herein. In practice, and as recognized by those of ordinary skill in the art, items shown separately could be combined and some items could be separated.

Details of the modules and data structures shown in FIG. 4 are described above in reference to FIGS. 1-3B, and further described below in reference to the flowcharts shown in FIGS. 5 and 6, according to some implementations.

Figure 5:
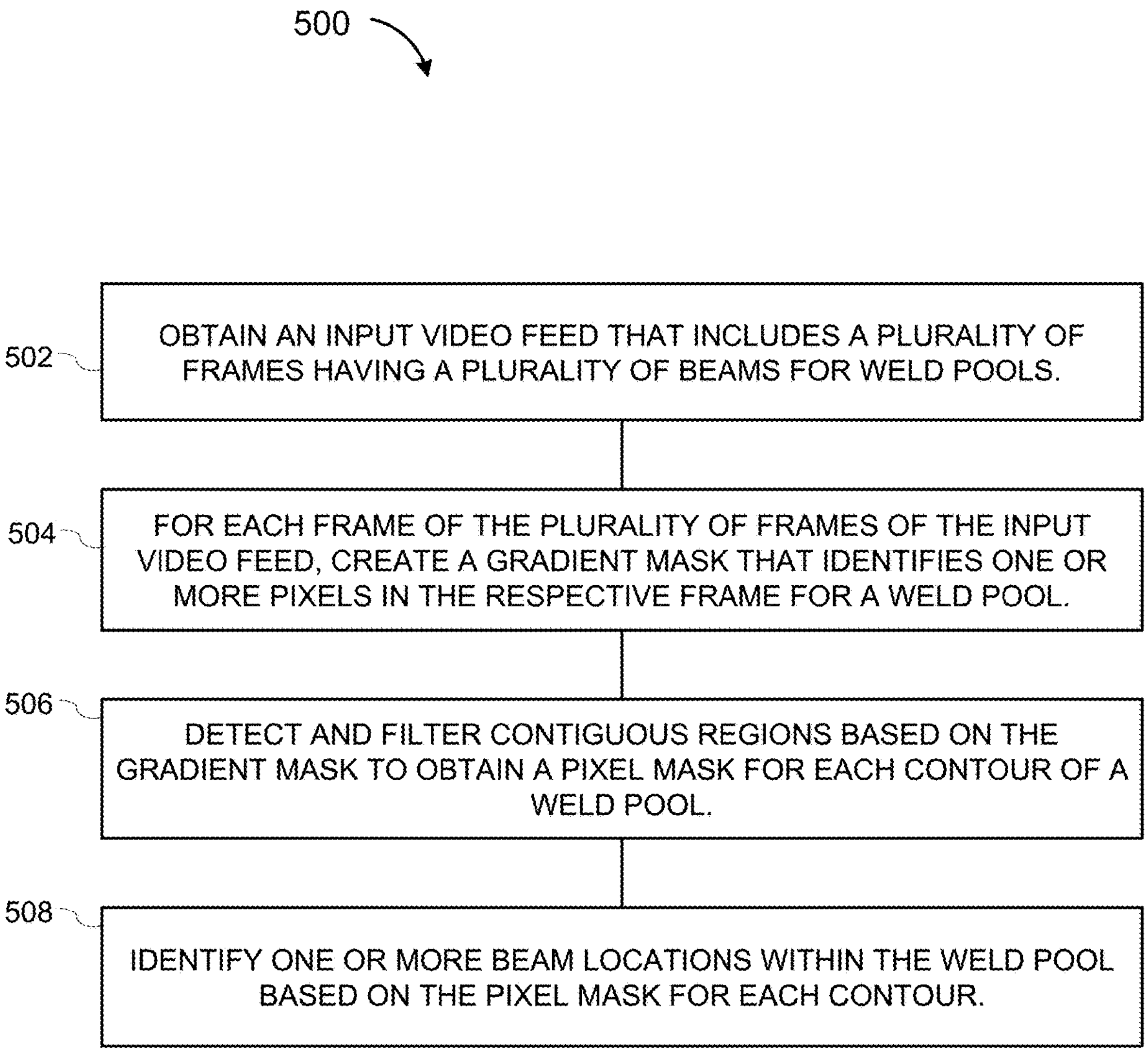
FIG. 5 is a flowchart of an example method for tracking multiple beams in weld pools, according to some implementations.

FIG. 5 is a flowchart of an example method 500 for tracking multiple beams in weld pools, according to some implementations. The method is performed at an electronic device (e.g., the computing device 400) having one or more processors (e.g., the CPU(s)/GPU(s) 402), and memory (e.g., the memory 414) storing one or more programs, configured for execution by the one or more processors.

The method includes obtaining (502) an input video feed that includes a plurality of frames having a plurality of beams for weld pools. For example, the imaging module 422 obtains the images 424.

The method also includes, for each frame of the plurality of frames of the input video feed, creating (504) a gradient mask that identifies one or more pixels in the respective frame for a weld pool. For example, the gradient mask generation module 426 generates the gradient mask 428. In some implementations, identifying the one or more pixels includes, for each pixel in the respective frame, calculating a time-based derivative of intensity for the respective pixel based on the respective frame and its predecessor frame in the video feed and determining potential locations of weld pools based on the time-based derivative of intensity for each pixel. In some implementations, determining potential locations of the weld pools includes computing at least one of (i) the relative intensity of each pixel with respect to background imagery, (ii) light emission intensity of material used for welding in near-infrared (NIR) and infrared (IR) spectrums, or (iii) a rapid decrease in intensity. Relative intensity typically includes a high, positive time delta in intensity. The beam is typically moving and brighter than the background imagery, so there will be a high, positive time delta in intensity. The beam typically deposits heat into the surrounding material for light emission intensity. If the material does not change phase from solid into liquid, the light emission intensity of the material typically increases. This is especially true in the NIR and IR spectrums. If the material does change phase, the emissions typically decrease. Liquid metal typically has less emissions in visible, NIR, and IR spectrums than the superheated solid metal around it. This likely results in a rapid decrease in intensity. In some implementations, determining potential locations of the weld pools includes thresholding the time-based derivative for each pixel with a high-low pass filter to create the gradient mask, thereby marking pixels with either a rapid increase or decrease in value as possible weld pool locations. In some implementations, the high-low pass filter is applied to the time-based derivative. It includes two threshold values: (i) a low value that is a negative number, where delta values below the number represent a phase change from powder to liquid metal, and (ii) a high value that is a positive number, above which either there is increasing heat or a beam is crossing over a pixel. The high-low pass filter excludes the band between the two threshold values (values closer to a zero delta) and selects either the high or low end, but not the middle. These thresholds need not be particularly conservative. Example values include 25 and 75 for low and high thresholds, respectively. In some implementations, the method further defines a respective threshold for each weld type. Some implementations provide a user interface to display a single, colorized delta image and a slider for each setting in order (for a user) to highlight the appropriate areas to select the threshold values. In some implementations, the method further includes using a morphological close filter on the gradient mask to close gaps between isolated pixels surrounding a possible weld pool location.

The method also includes detecting and filtering (506) contiguous regions based on the gradient mask to obtain a pixel mask for each contour of a weld pool. For example, the pixel mask generation module 430 generates the pixel masks 432. In some implementations, obtaining the pixel mask for each contour of a weld pool includes detecting contours based on the gradient mask (e.g., applying a contour detection algorithm to the gradient mask), filtering the contours by size with a high-pass filter to eliminate any regions too small to reasonably be a weld pool (e.g., it may be specific to an application or spot with less than 100 pixels may be considered too small to be a weld pool), and outputting the pixel mask for each remaining contour.

The method also includes identifying (508) one or more beam locations within the weld pool based on the pixel mask for each contour. For example, the beam location identification module 434 identifies the beam locations 436. In some implementations, identifying the one or more beam locations within each weld pool includes identifying a peak intensity by computing a local maximum value within the pixel mask for each contour, identifying missing beams for each contour by determining if the peak intensity is below a predetermined range (typically the top 1% of the intensity range in the image), applying a high-pass threshold to the surrounding area based on the peak intensity to determine a spot area, and computing coordinates of the beam location based on a mean value or center of mass of the spot area. In some implementations, identifying the one or more beam locations within each weld pool further includes identifying multiple beam locations in the weld pool by (i) measuring the total size and aspect ratio the weld pool and (ii) when the weld pool has a substantially increased size or a moderately increased size and an unusual aspect ratio, detecting bimodal peaks within the high-intensity range. Since beams may cross over each other, there may be multiple beam locations in the same weld pool. Some implementations determine if this case is likely by measuring the weld pool's total size and aspect ratio. Doubling the thermal input of the weld typically results in a rapid expansion in width and potential length of the pool.

Figure 6:
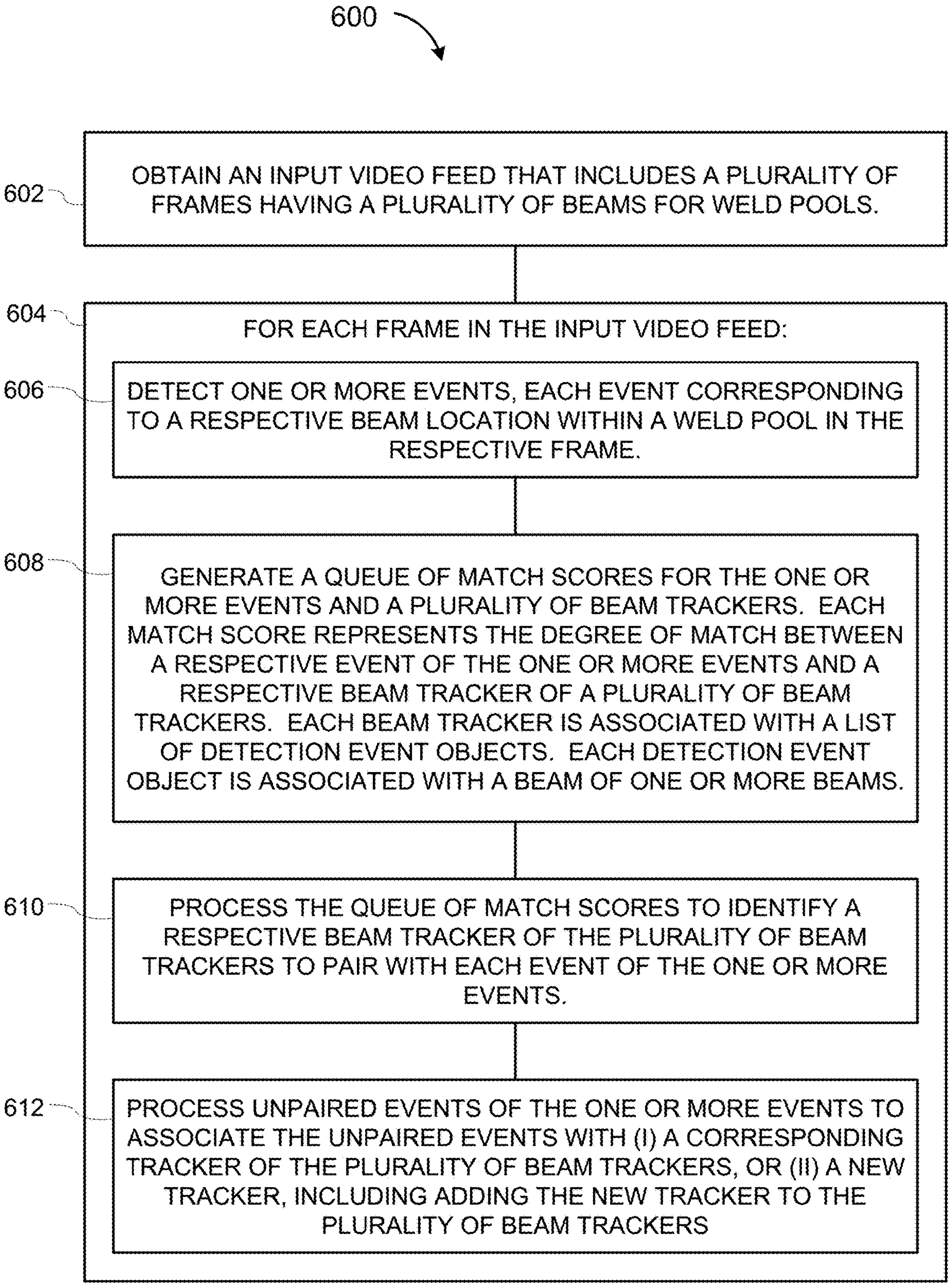
FIG. 6 is a flowchart of another example method for tracking multiple beams in weld pools, according to some implementations.

FIG. 6 is a flowchart of an example method 600 for tracking multiple beams in weld pools, according to some implementations. The method is performed at an electronic device (e.g., the computing device 400) having one or more processors (e.g., the CPU(s)/GPU(s) 402), and memory (e.g., the memory 414) storing one or more programs, configured for execution by the one or more processors.

The method includes obtaining (602) an input video feed that includes a plurality of frames having a plurality of beams for weld pool. For example, the imaging module 422 obtains the images 424.

The method includes performing (604) a sequence of steps for each frame in the video feed. The sequence of steps may be performed by the beam tracking module 438. The method includes detecting (606) one or more events 440, each event corresponding to a respective beam location within a weld pool in the respective frame. In some implementations, detecting the one or more events includes: identifying a weld pool by detecting and filtering contiguous regions in the respective frame, storing a bounding box of the weld pool in a new detection event object for an event of the one or more events, identifying a beam location within the weld pool based on detecting peak intensities and high-pass thresholding the surrounding area with the peak intensities, and storing coordinates of the beam location in the new detection event object. In some implementations, detecting the one or more events further includes determining if the weld pool has multiple beam locations by measuring the total size and aspect ratio of the weld pool and when the weld pool includes multiple beams and there are bimodal peaks in the peak intensities, generating a second detection event object for a second beam location within the weld pool.

The method also includes generating (608) a queue of match scores 442 for the one or more events and a plurality of beam trackers. Each match score represents the degree of match between a respective event of the one or more events and a respective beam tracker of a plurality of beam trackers. Each beam tracker is associated with a list of detection event objects 446. Each detection event object is associated with a beam of one or more beams. In some implementations, each beam tracker further includes (i) a unique identifier, (ii) a video output file or object for a video being extracted, (iii) a cache list or vector of images, and (iv) an integer presenting the last crossing timestep. In some implementations, each detection event object includes (i) X/Y coordinates of a beam, (ii) a frame number or timestep, (iii) a bounding box and/or a pixel mask of detected weld pool area, and (iv) a list of tracker identifiers in case of crossing events. In some implementations, generating the queue of match scores includes calculating and adding, to the queue of match scores, a match score between the respective event and the respective beam tracker, based on (i) the position of the respective event $P_E$, (ii) the last known location of the respective beam tracker $P_T$, (iii) the number of timesteps since the last detection in the respective beam tracker $\Delta_T$, (iv) the predicted next location of the respective beam tracker $P_P$, (v) the average global beam velocity per timestep $\mu_v$, and (vi) the user-defined maximum velocity $V_{max}$. In some implementations, generating the queue of match scores further includes forgoing adding the match score to the queue when the distance between $P_E$ and $P_T$ is greater than $V_{max}*\Delta_T$. In some implementations, the match score is an ordered structure that includes $$\Delta V_T = \frac{\text{abs}(dist(P_T, P_P) - dist(P_T, P_E))}{\mu_V * \Delta T},$$

which corresponds to the magnitude of acceleration/deceleration, normalized to average $$\theta_{EP} = \text{abs}\left(\frac{\cos^{-1}\left(\frac{(P_E - P_T)\cdot(P_P - P_T)}{dist(P_E, P_T) * dist(P_P, P_T)}\right)}{180}\right),$$

which corresponds to the angle between the vector to the event and the vector to the prediction, normalized to 180, $$V_{MD} = \frac{\text{abs}(dist(P_T, P_E) - \mu_V * \Delta T) + \max(0, dist(P_T, P_E) - \mu_V * \Delta T)}{\mu_V * \Delta T},$$

which corresponds to the mean deviation from average velocity, normalized to average velocity, plus a penalty for exceeding average velocity, and a vector/list of indices of the respective event and the respective beam tracker.

The method also includes processing (610) the queue of match scores to identify a respective beam tracker of the plurality of beam trackers 444 to pair with each event of the one or more events. In some implementations, processing the queue of match scores includes determining if each event of the one or more events can be paired with each beam tracker of the plurality of beam trackers based on the queue of match scores. An event can be paired with a beam tracker only if its corresponding match score in the queue of match scores is above a predetermined threshold (e.g., the distance between $P_E$ and $P_T$ is less than $V_{max}*\Delta_T$). The method also includes: for each beam tracker of the plurality of beam trackers, when the respective beam tracker cannot be paired with any event of the one or more events, remove the respective beam tracker from the queue. When the respective beam tracker can be paired with more than one event of the one or more events, the method sorts pairs and selects the best matching event based on match scores for the pairs. The method also includes, when the respective beam tracker can be paired with only one event of the one or more events and the only one event can be paired with more than one beam tracker: adding paired beam trackers to the only one event's crossing list and updating paired beam trackers' crossing timesteps. When (i) the respective beam tracker corresponds to a best match for the only one event or (ii) the only one event can be paired with only the respective beam tracker, the system includes the only one event in the list of detection event objects for the respective beam tracker, removes all pairs containing either the only one event or the respective beam tracker from the queue, and removes the respective beam tracker from the queue.

The method also includes processing (612) unpaired events of the one or more events to associate the unpaired events with (i) a corresponding tracker of the plurality of beam trackers, or (ii) a new tracker, including adding the new tracker to the plurality of beam trackers. In some implementations, processing the unpaired events includes calculating a crossing time threshold CTT, which is the maximum amount of time after which a beam should separate or reappear after having crossed with another beam, based on formula:

$$CTT = \frac{2 * (\text{average weld pool length})}{\mu_V}.$$

Here, $\mu_v$ is the average global beam velocity per timestep. The system identifies one or more beam trackers from the plurality of beam trackers to pair with each unpaired event, based on checking all events for all beam trackers with timestamps in the last CTT timesteps for crossing list entries. In some implementations, processing the unpaired events further includes, while checking all events for all beam trackers with timestamps in the last CTT timesteps for crossing list entries, disregarding beams that have not been detected within a period of time IT calculated based on a threshold that is the greater of the following two values: (a) if on a machine that has pulsed beams or beams that rapidly cycle between locations, then $$IT = \frac{\text{Maximum period of oscillation}}{\text{Length of timestep}} + 1,$$

and (b) otherwise, IT=CTT, to account for crossing events.

In some implementations, the method further includes extracting weld pool images for each beam tracker of the plurality of beam trackers that is active in each video frame of the video feed.

The terminology used in the description of the invention herein is for the purpose of describing particular implementations only and is not intended to limit the invention. As used in the description of the invention and the appended claims, the singular forms "a," "an," and "the" are intended to include the plural forms as well unless the context indicates otherwise. It will also be understood that the term "and/or" as used herein refers to and encompasses any possible combinations of one or more of the associated listed items. It will be further understood that the terms "comprises" and/or "comprising," when used in this specification, specify the presence of stated features, steps, operations, elements, and/or components but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for tracking multiple beams in weld pools, the method comprising:

obtaining an input video feed that includes a plurality of frames having a plurality of beams for weld pools;

for each frame of the plurality of frames of the input video feed, creating a gradient mask that identifies one or more pixels in the respective frame for a weld pool;

detecting and filtering contiguous regions based on the gradient mask to obtain a pixel mask for each contour of a weld pool; and identifying one or more beam locations within the weld pool based on the pixel mask for each contour, wherein identifying the one or more beam locations within each weld pool comprises:

identifying a peak intensity by computing a local maximum value within the pixel mask for each contour;

identifying missing beams for each contour by determining if the peak intensity is below a predetermined range;

applying a high-pass threshold to surrounding area based on the peak intensity to determine a spot area; and computing coordinates of the one or more beam location based on a mean value or center of mass of the spot area.

2. The method of claim 1, wherein identifying the one or more pixels comprises:

for each pixel in the respective frame, calculating a time-based derivative of intensity for the respective pixel based on the respective frame and its predecessor frame in the video feed; and determining potential locations of weld pools based on the time-based derivative of intensity for each pixel.

3. The method of claim 2, wherein determining potential locations of the weld pools comprises:

computing at least one of: (i) relative intensity of each pixel with respect to background imagery, (ii) light emission intensity of material used for welding in near-infrared (NIR) and infrared (IR) spectrums, or (iii) a rapid decrease in intensity.

4. The method of claim 2, wherein determining potential locations of the weld pools comprises:

thresholding the time-based derivative for each pixel with a high-low pass filter to create the gradient mask, thereby marking pixels with either a rapid increase or decrease in value as possible weld pool locations.

5. The method of claim 4, wherein the high-low pass filter is applied to the time-based derivative and includes two threshold values including (i) a low value that is a negative number, for which delta values below the low value represent a phase change from powder to liquid metal, and (ii) a high value that is a positive number, above which either there is increasing heat or a beam is crossing over a pixel.

6. The method of claim 4, further comprising:

defining a respective threshold for each weld type.

7. The method of claim 4, further comprising:

using a morphological close filter on the gradient mask to close any gaps between isolated pixels surrounding a possible weld pool location.

8. The method of claim 1, wherein obtaining the pixel mask for each contour of a weld pool comprises:

detecting contours based on the gradient mask;

filtering the contours by size with a high-pass filter in order to eliminate any regions too small to reasonably be a weld pool; and outputting the pixel mask for each remaining contour.

9. The method of claim 1, wherein identifying the one or more beam locations within each weld pool further comprises:

identifying multiple beam locations in the weld pool by (i) measuring a total size and aspect ratio the weld pool, and (ii) in accordance with a determination that the weld pool has a substantially increased size or a moderately increased size and an unusual aspect ratio, detecting bimodal peaks within a high intensity range.

10. A computer system comprising:

one or more processors; and memory;

wherein the memory stores one or more programs configured for execution by the one or more processors, and the one or more programs comprise instructions for performing the method of claim 1.

11. A non-transitory computer readable storage medium storing one or more programs configured for execution by a computer system having one or more processors and memory, the one or more programs comprising instructions for performing the method of claim 1.

12. A method for tracking multiple beams in weld pools, the method comprising:

obtaining an input video feed that includes a plurality of frames having a plurality of beams for weld pools;

for each frame of the plurality of frames of the input video feed, creating a gradient mask that identifies one or more pixels in the respective frame for a weld pool;

detecting and filtering contiguous regions based on the gradient mask to obtain a pixel mask for each contour of a weld pool; and identifying one or more beam locations within the weld pool based on the pixel mask for each contour, wherein identifying the one or more pixels comprises:

for each pixel in the respective frame, calculating a time-based derivative of intensity for the respective pixel based on the respective frame and its predecessor frame in the video feed; and determining potential locations of weld pools based on the time-based derivative of intensity for each pixel, wherein determining potential locations of the weld pools comprises:

thresholding the time-based derivative for each pixel with a high-low pass filter to create the gradient mask, thereby marking pixels with either a rapid increase or decrease in value as possible weld pool locations, and wherein the high-low pass filter is applied to the time-based derivative and includes two threshold values including (i) a low value that is a negative number, for which delta values below the low value represent a phase change from powder to liquid metal, and (ii) a high value that is a positive number, above which either there is increasing heat or a beam is crossing over a pixel.

13. The method of claim 12, further comprising:

defining a respective threshold for each weld type.

14. The method of claim 12, wherein obtaining the pixel mask for each contour of a weld pool comprises:

detecting contours based on the gradient mask;

filtering the contours by size with a high-pass filter in order to eliminate any regions too small to reasonably be a weld pool; and outputting the pixel mask for each remaining contour.

15. A computer system comprising:

one or more processors; and memory;

wherein the memory stores one or more programs configured for execution by the one or more processors, and the one or more programs comprise instructions for performing the method of claim 12.

16. A non-transitory computer readable storage medium storing one or more programs configured for execution by a computer system having one or more processors and memory, the one or more programs comprising instructions for performing the method of claim 12.

17. A method for tracking multiple beams in weld pools, the method comprising:

obtaining an input video feed that includes a plurality of frames having a plurality of beams for weld pools;

for each frame of the plurality of frames of the input video feed, creating a gradient mask that identifies one or more pixels in the respective frame for a weld pool;

detecting and filtering contiguous regions based on the gradient mask to obtain a pixel mask for each contour of a weld pool; and identifying one or more beam locations within the weld pool based on the pixel mask for each contour, wherein identifying the one or more pixels comprises:

for each pixel in the respective frame, calculating a time-based derivative of intensity for the respective pixel based on the respective frame and its predecessor frame in the video feed; and determining potential locations of weld pools based on the time-based derivative of intensity for each pixel, wherein determining potential locations of the weld pools comprises:

thresholding the time-based derivative for each pixel with a high-low pass filter to create the gradient mask, thereby marking pixels with either a rapid increase or decrease in value as possible weld pool locations, and wherein the method further comprises:

using a morphological close filter on the gradient mask to close any gaps between isolated pixels surrounding a possible weld pool location.

18. The method of claim 17, further comprising:

defining a respective threshold for each weld type.

19. The method of claim 17, wherein obtaining the pixel mask for each contour of a weld pool comprises:

detecting contours based on the gradient mask;

filtering the contours by size with a high-pass filter in order to eliminate any regions too small to reasonably be a weld pool; and outputting the pixel mask for each remaining contour.

20. A computer system comprising:

one or more processors; and memory;

wherein the memory stores one or more programs configured for execution by the one or more processors, and the one or more programs comprise instructions for performing the method of claim 17.

21. A non-transitory computer readable storage medium storing one or more programs configured for execution by a computer system having one or more processors and memory, the one or more programs comprising instructions for performing the method of claim 17.

* * * * *